(12) United States Patent
Hockings et al.

(10) Patent No.: US 8,560,712 B2
(45) Date of Patent: Oct. 15, 2013

(54) METHOD FOR DETECTING AND APPLYING DIFFERENT SECURITY POLICIES TO ACTIVE CLIENT REQUESTS RUNNING WITHIN SECURE USER WEB SESSIONS

(75) Inventors: Christopher John Hockings, Burleigh Waters (AU); Trevor Scott Norvill, Southport (AU); Scott Anthony Exton, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 13/101,458

(22) Filed: May 5, 2011

(65) Prior Publication Data

US 2012/0284767 A1  Nov. 8, 2012

(51) Int. Cl.
*G06F 15/16* (2006.01)
(52) U.S. Cl.
USPC .............................. 709/229; 726/14
(58) Field of Classification Search
USPC ............................. 726/14; 709/229
See application file for complete search history.

(56) References Cited

U.S. PATENT DOCUMENTS

| | | | |
|---|---|---|---|
| 6,910,077 B2 | 6/2005 | Najork | |
| 6,944,666 B2 | 9/2005 | Belkin | |
| 7,206,852 B2 | 4/2007 | Ferguson et al. | |
| 2005/0157722 A1 | 7/2005 | Yoshimoto et al. | |
| 2006/0182966 A1* | 8/2006 | Lee et al. ...................... | 428/375 |
| 2007/0124290 A1 | 5/2007 | Swanson et al. | |
| 2012/0124192 A1* | 5/2012 | Daoud et al. .................. | 709/224 |
| 2012/0137340 A1* | 5/2012 | Jakobsson et al. ................ | 726/1 |

OTHER PUBLICATIONS

Alosefer et al, "Honeyware: a web-based low interaction client honeypot," 2010 International Conference on Software Testing Verification and Validation Workshops (2010).

* cited by examiner

*Primary Examiner* — Christopher Brown
(74) *Attorney, Agent, or Firm* — Jeffrey S. LaBaw; David H. Judson

(57) ABSTRACT

A method for detecting and applying security policy to active client requests within a secure user session begins by applying a first heuristic to a plurality of requests for a particular resource to identify a pattern indicating of an active client. In one embodiment, the heuristic evaluates a frequency of requests for the particular resource across one or more secure user sessions. Later, upon receipt of a new request for the particular resource, a determination is then made whether the new request is consistent with the pattern. If so, an action is taken with respect to a secure session policy. In one embodiment, the action bypasses the secure session policy, which policy is associated with an inactivity time-out that might otherwise have been triggered upon receipt of the new request. In addition, a second heuristic may be applied to determine whether a response proposed to be returned (in response to the new request) is expected by the active client. If so, the response is returned unaltered. If, however, applying the second heuristic indicates that the response proposed to be returned is not expected by the active client, the response is modified to create a modified response, which is then returned.

22 Claims, 3 Drawing Sheets

METHOD FOR DETECTING AND APPLYING DIFFERENT SECURITY POLICIES TO ACTIVE CLIENT REQUESTS RUNNING WITHIN SECURE USER WEB SESSIONS

BACKGROUND OF THE INVENTION

1. Technical Field

This disclosure relates generally to web application security and in particular to a method and system for detecting and applying different security policies to active client requests.

2. Background of the Related Art

Traditional secure web servers have deficiencies in servicing active client code requests originating within authenticated (user) browser sessions. As is well-known, "active client" code refers to software (typically code executing within a web browser) that runs without user intervention or control. Active client code typically is Asynchronous JavaScript and XML, collectively referred to as AJAX. While active client code can provide useful functionality, it can also create undesirable behaviors within browsers, especially with respect to user-centric security policy controls (e.g., inactivity time-outs), as well as during dynamic response rendering.

In particular, web server user session inactivity time-outs are designed to provide some protection against unauthorized use of a secure web session. Typically, inactivity time-outs are statically configured by the secure web server using configuration data. Such time-outs may also be set dynamically on a per user/session basis. If the client system becomes idle for the configured period of time, theoretically the server that holds the session marks the session as unusable until such time as either (a) never, or (b) the user authenticates again. When configured for re-authentication, the user is prompted for authentication credentials, the receipt of which un-locks the session to be used again. In many web applications, however, active code running within the browser often sends requests without direct input by the end user. In such cases, the secure web server responds to such requests by re-setting the inactivity countdown timer. As a result, even if the user walks away from his or her computer for an extended time period, the secure web server continues to honor these active client requests and, in so doing, it continually re-sets the inactivity countdown timer. This results in the inactivity time-out failing to satisfy the configured time-out period, resulting in a potential security exposure for end users.

One approach to addressing the problem of active code overriding the inactivity time-out is to specify a fixed set of URLs to be excluded from impacting the inactivity countdown timer. This approach, however, requires an administrator of the system to know all of the URLs (or at least portions thereof) so that they can be configured into the system. This is not always practical, as many web developers are not aware of the resulting request access URLs. Another approach to this problem involves deploying alternative web server gateways to service the active code requests. This requires additional hardware, and therefore additional cost. In addition, in the event these AJAX requests require authentication, it is necessary to embed cryptographic tokens in each web service request, which is non-optimal from a performance or cost perspective.

Another problem involves the issue of how the web server process should respond to the active client request. In dynamic response rendering, once a request is detected, the response from the web application should be inspected to ensure that the response content is appropriate for the active client code. In current secure web servers, if an error is detected, often the active client code is delivered a generic response that the client does not expect, or should not expect, to handle. In the case of a secure session, if the user's session expires, the user would then be prompted to authenticate again using a web form. In most cases, such a response is not handled suitably by active client code. While AJAX code could be developed to handle an unexpected response from the server within the active code itself, this is not optimal, as every AJAX-style request would need to have associated response code handling. This is not achievable in a typical secure web server-based operating environment, especially where reverse proxies are deployed across many web applications.

Having the ability to detect and act upon active client requests in a different way to normal browser requests would help to alleviate these deficiencies, especially in the active client scenarios described.

BRIEF SUMMARY

According to this disclosure, web browser "active client requests" are isolated so that security policy may be applied to them. The technique is carried during a secure user web session between an HTTP client having active client code, and a secure web server process executing an analytics engine. The analytics engine applies one or more heuristic functions (or "heuristics") to detect whether a received HTTP request is received from an active client (as opposed to an end user interaction) and, if so, whether a response to that request should be modified so as to conform in some manner to what the active client code expects to receive in response to that request. If an HTTP request from an active client is detected, the web server process preferably takes a given action with respect to an associated security policy. Thus, for example, if the security policy involves an inactivity time-out, the given action bypasses the time-out for the particular request.

Thus, according to an embodiment, a method (i) heuristically determines whether an HTTP request is received from an active client, and if so, (ii) bypasses a security policy otherwise applicable to the HTTP request and heuristically determines whether to modify a response to the HTTP request prior to returning the response to the active client. As a consequence, active client requests are handled differently from user-driven secure web application requests, particularly with respect to inactivity time-out handling and dynamic response processing.

According to an embodiment, a secure web server that holds user sessions determines if a particular request is being accessed by an active client, or by an end user. Using analytical techniques across a set of requests, patterns are used to determine whether a particular URL is likely being accessed by active code. Such requests are then excluded from impacting secure web server inactivity timers, and the responses from such requests are (or may be) modified to conform to one or more pre-defined responses for active clients.

According to a particular embodiment, a method for detecting and applying security policy to active client requests within a secure user session begins by applying a first heuristic to a plurality of requests for a particular resource to identify a pattern indicating of an active client. In one embodiment, the heuristic evaluates a frequency of requests for the particular resource across one or more secure user sessions. Later, upon receipt of a new request for the particular resource, a determination is then made whether the new request is consistent with the pattern. If so, an action is taken with respect to a secure session policy. In one embodiment, the action bypasses the secure session policy, which policy is associated with an inactivity time-out that might otherwise have been triggered upon receipt of the new request. In addition, a second heuristic may be applied to determine whether a response proposed to be returned (in response to the new request) is expected by the active client. If so, the response is returned unaltered. If, however, applying the second heuristic indicates that the response proposed to be returned is not expected by the active client, the response is modified to create a modified response, which is then returned.

Although not meant to be limiting, the secure user session in which the above-described method is implemented is a secure web user session, and the request is an HTTP request generated by active code, such as AJAX code.

In an alternative embodiment, the above-described method is performed in an apparatus. The apparatus carries out the method during an existing authenticated session with a user operating the client browser.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
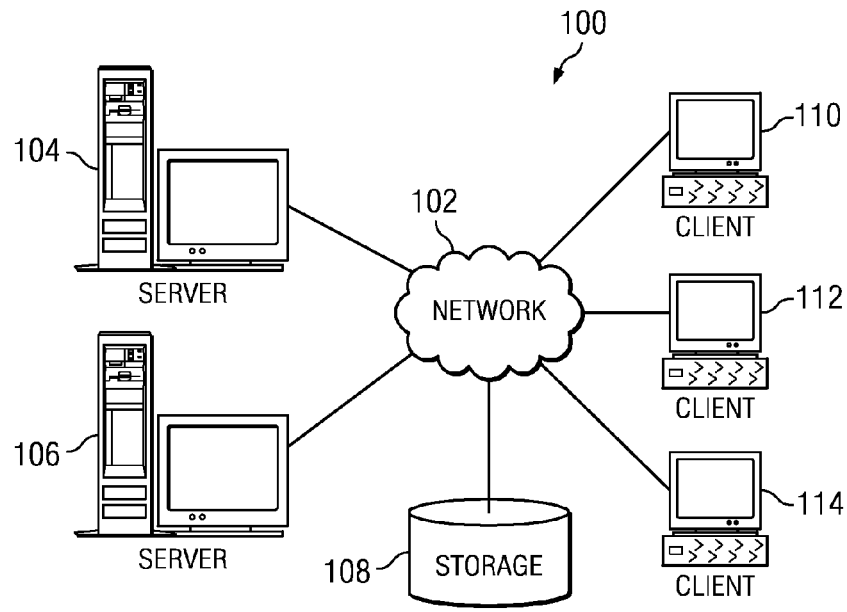
FIG. 1 depicts an exemplary block diagram of a distributed data processing environment in which exemplary aspects of the illustrative embodiments may be implemented.
Figure 2:
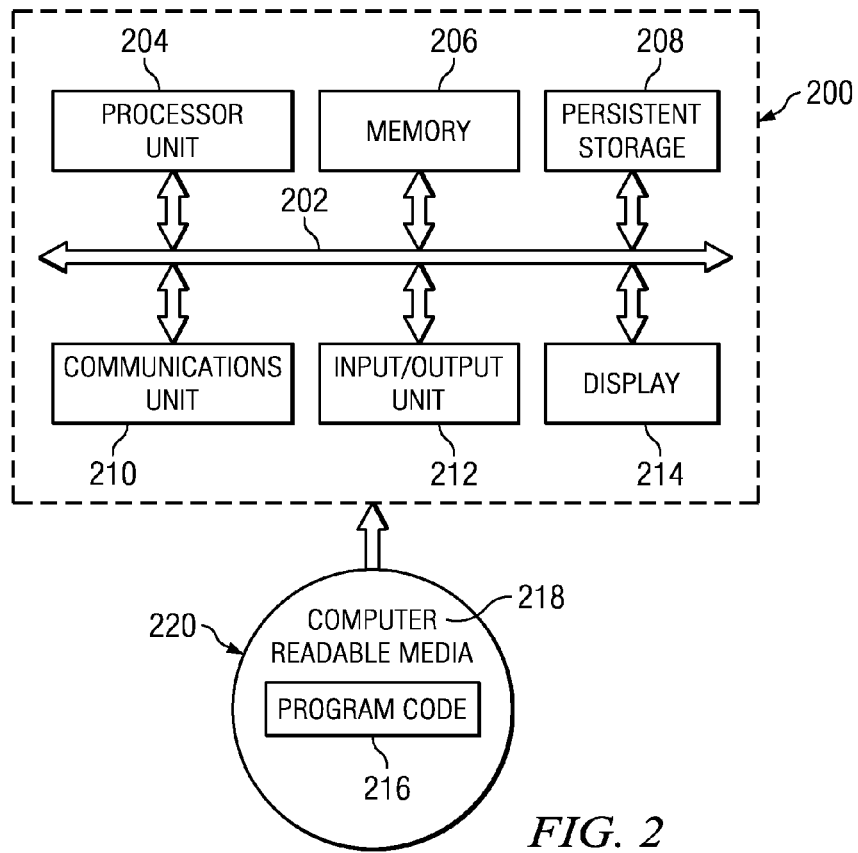
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

A data processing system such as illustrated in FIG. 2 may be configured as a client system, or a server system. In the case of a client system, a browser executing in the system is configured to execute (or otherwise executes natively) active client code. As described above, active client code triggers requests (typically, HTTP requests) without user intervention, i.e., automatically. Asynchronous JavaScript and XML (collectively referred to as AJAX) are well-known technologies that allow user interaction with Web pages to be decoupled from the Web browser's communications with a Web server. AJAX is built upon dynamic HTML (DHTML) technologies including: JavaScript, a scripting language commonly used in client-side Web applications; the Document Object Model (DOM), a standard object model for representing HTML or XML documents; and Cascading Style Sheets (CSS), a style sheet language used to describe the presentation of HTML documents. In AJAX, client-side JavaScript updates the presentation of a Web page by dynamically modifying a DOM tree and a style sheet. In addition, asynchronous communication, enabled by additional technologies, allows dynamic updates of data without the need to reload the entire Web page. These additional technologies include XMLHttpRequest, an application programming interface (API) that allows client-side JavaScript to make HTTP connections to a remote server and to exchange data, and JavaScript Serialized Object Notation (JSON), a lightweight, text-based, language-independent data-interchange format. JSON is based on a subset of the JavaScript Programming Language, Standard ECMA-262, $3^{rd}$ Edition, dated December 1999. It is also described in Request for Comment (RFC) 4627. JSON syntax is a text format defined with a collection of name/value pairs and an ordered list of values. JSON is very useful for sending structured data over the wire (e.g., the Internet) that is lightweight and easy to parse. It is language-independent but uses conventions that are familiar to C-family programming conventions. Further information about JSON can be found as json.org.

Figure 3:
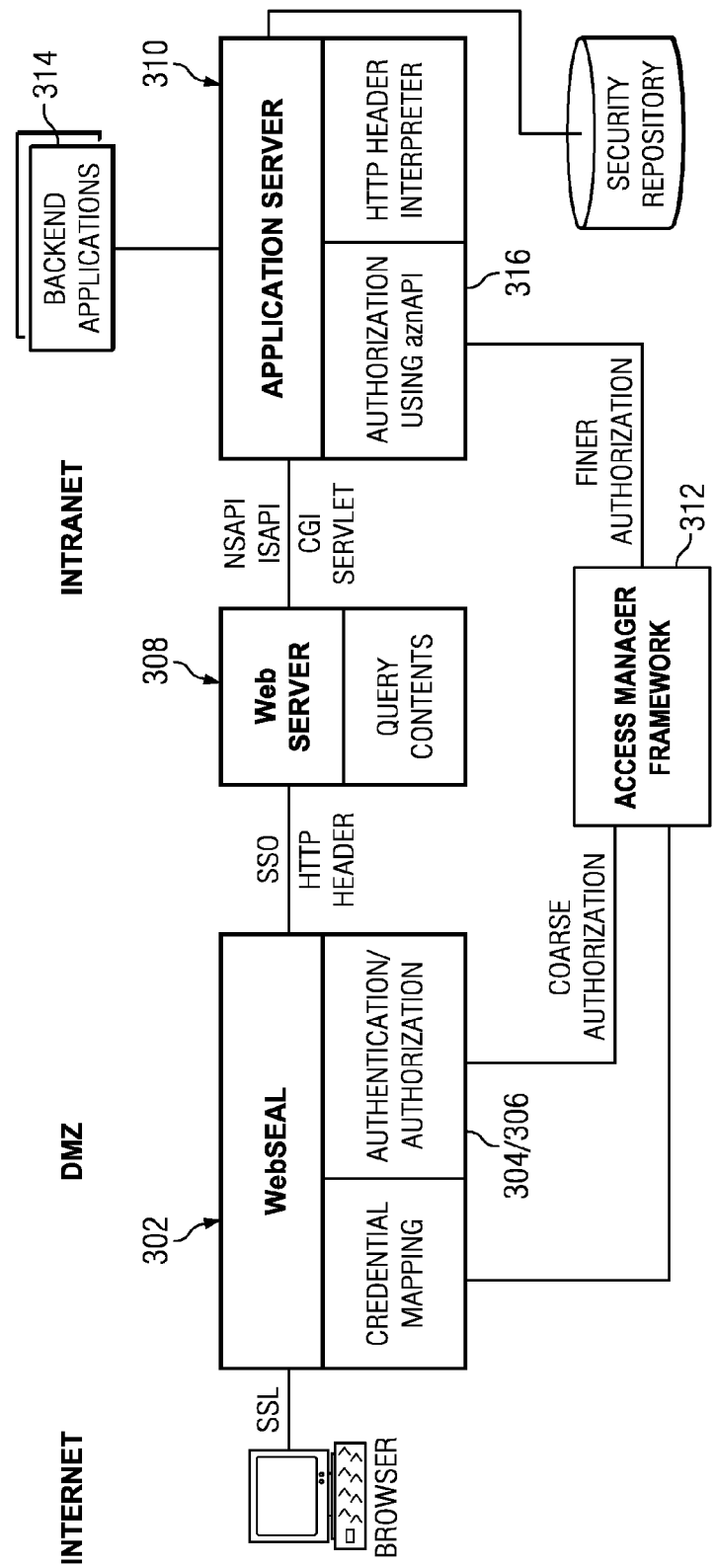
FIG. 3 illustrates a Web portal having an access management framework in which the subject disclosure may be implemented.

As will now be described, the technique that is the subject of this disclosure typically is implemented in a system that includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the disclosed subject matter. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

As one of ordinary skill in the art will appreciate, TAM provides a reverse proxy, web plug-in or the like that provides session management functionality and that includes authorization functionality as part of this session management. Authentication is handled by TAM, meaning that TAM collects a user's authentication credentials, evaluates them, and establishes a session, including some form of session management functionality (such as a session cookie). To provide a user with the advantages of this consolidated environment, TAM then provides a single sign-on solution for the user by asserting authentication credentials (such as username/password) to the back-end applications. This allows the back-end application to be added to the portal environment without modification.

Figure 4:
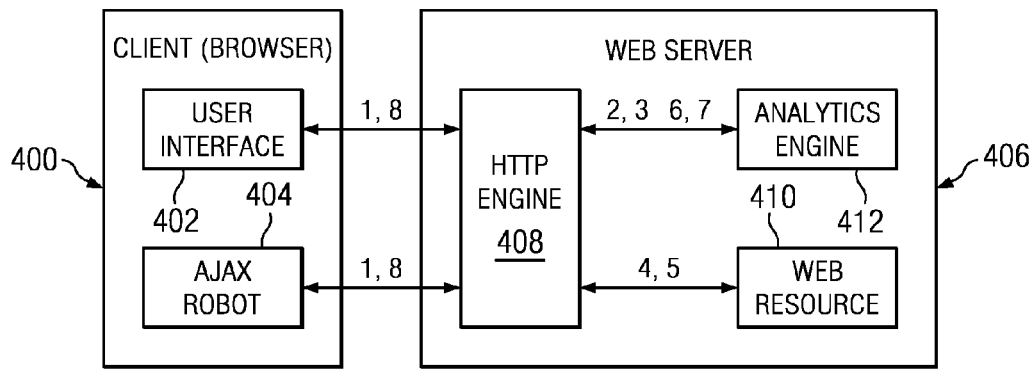
FIG. 4 is a simplified block diagram of a secure web session between an HTTP client executing active code, and an HTTP secure web server process executing an analytics engine according to this disclosure.

The subject matter herein is implemented across an active client-enabled web browser interacting with a secure web server. An authenticated (user) browser session has been established between the browser and the secure web server with respect to a web application executing on the web server, all in a well-known manner. The particular manner in which the secure browser session has been established is not within the scope of this disclosure. FIG. 4 illustrates a representative scenario. Here, the client system includes an HTTP client 400 (typically a browser) having a user interface 402, and an active client 404, such as an AJAX robot. The user interface 402 is used by an end user to create a user-initiated request. The active client 404 generates an automated request. A secure web server process 406 comprises an HTTP engine 408 for receiving and managing HTTP requests, also in a known manner, and such requests typically are for web resources, one of which is shown at 410. The secure web server process 406 may be executing as a web proxy. The web resource(s) 410 may reside within the secure web server process 406, or they may be web-based resources that are provided from an external system by a proxy or the like. According to this disclosure, the secure web server process 406 is augmented to include an analytics engine 412, the function of which is now described. While the analytics engine 412 is shown as residing within the secure web server process, this is not a requirement. The analytics engine 412 may execute in a separate processing environment. In a representative embodiment as shown, the engine 412 executes in the secure web server process 406 as a servlet, as a plug-in, as native code, as an execution thread, or the like.

Figure 5:
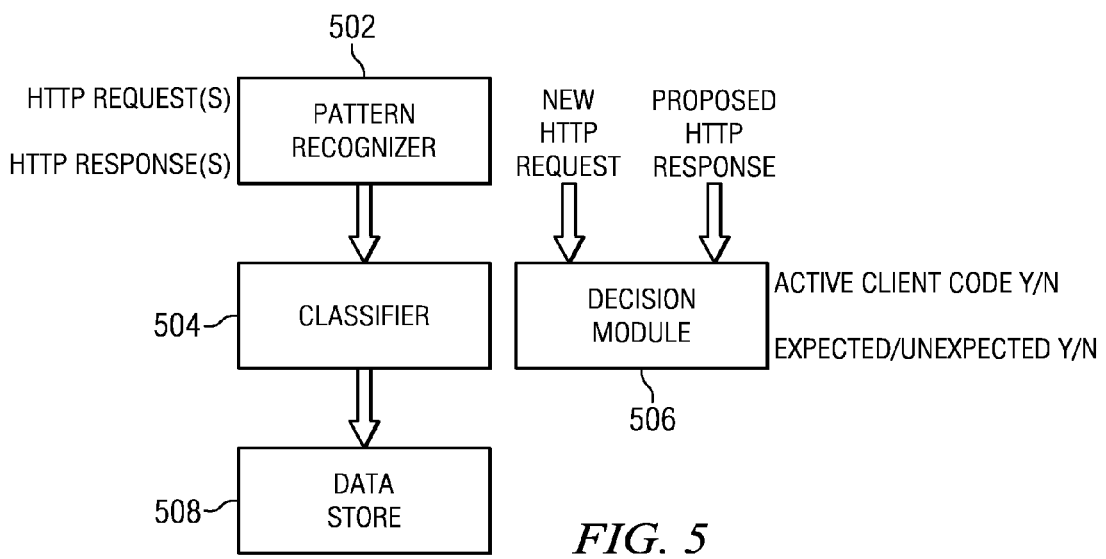
FIG. 5 illustrates a block diagram of the analytics engine according to a preferred embodiment of this disclosure.

The analytics engine 412 is illustrated in more detail in FIG. 5. The engine comprises a set of functional components that may be implemented in software, e.g., as a set of program instructions executed by a processor. In particular, analytics engine 500 comprises a pattern recognizer 502, a classifier 504, a decision module 506, and a data store 508. Generally, the pattern recognizer 502 applies a heuristic function or "heuristic" to a plurality of requests for a particular resource in an attempt to identify a pattern that indicates (explicitly or implicitly) that the request for the particular resource is received from active client code (as opposed to end user interactivity). A heuristic is a function that ranks alternatives based on the available information (heuristically) to make a decision or to draw a particular conclusion. Thus, for example, a set of requests for the particular object may exhibit a temporal characteristic (e.g., it repeats once per minute) indicative that it is being generated by robot code, such as AJAX. If the pattern recognizer determines that a "pattern" characteristic of an active client code request has been identified, it provides data to the classifier 504, which classifies the pattern. Information associating the request to the identified pattern is then stored in the data store 508 for future use. Of course, one of ordinary skill will recognize that the particular heuristic that may be applied to the HTTP request accesses may be quite varied. The heuristic may be time-based, frequency-based, URL-based, or any combination thereof. In a preferred implementation, the pattern recognizer evaluates a frequency of requests for the particular resource across one or more secure user sessions. A resulting pattern is then stored. Later, the decision module 506 is used to evaluate whether a new HTTP request matches any pattern stored in the data store 508. As will be described, this operation is carried out upon receipt of the new request and is for the purpose of determining whether the new HTTP request can be characterized as being received from active code.

The above description concerns the HTTP request itself. The pattern recognizer 502, classifier 504, and the decision module 506 have a companion set of operations that apply to the response that is proposed to be delivered by the web server process to the HTTP request. This response typically is some requested web resource, as will be seen. In this aspect of the analytics engine operation, the pattern recognizer 502 applies a heuristic (a "second" heuristic, distinct from the "first" heuristic applied to characterize the HTTP request) to a plurality of HTTP responses, once again to identify one or more patterns. If the pattern recognizer determines that a "pattern" response to an active client code request has been identified, it provides data to the classifier 504, which classifies the pattern response. Information associating the response to the identified pattern is then stored in the data store 508, once again for future use. Of course, one of ordinary skill will recognize that the particular heuristic that may be applied to the HTTP response may be quite varied, although preferably it is a frequency-based (e.g., how closely a proposed response resembles previous responses). Once a particular response is identified as expected or unexpected, the decision module 506 is used to determine whether a proposed response (to a new HTTP request) needs to be modified so as to better conform (or be acceptable) to the active client code that generated that new HTTP request.

An example "first heuristic" is now described. For each request, in a first step the pattern recognizer 502 notes the URL along with a timestamp of the request. Then, in a second step, the pattern recognizer caches requests for a configurable amount of time for the purpose of enabling the pattern recognition. A rule used to match requests preferably is configurable, and it may be defined in any convenient manner, such as a percentage of the request that must match, a regular expression, or the like. A rule may be defined that ignores a query string of the requests. These steps generate a list of URLs. Periodically, the list created by these steps is analyzed by the pattern recognizer 502 for URLs that appear to have a common frequency across some or all user sessions. In this approach, the classifier 504 might then operate as follows. URL patterns that show a repeated frequency are classified as an "active client" request. The classifier then uses a configuration item to determine the range of frequencies with which to classify the data from the pattern recognizer. The URL patterns classified as active client request are then stored in the data store 508. The decision module 506 then pattern-matches new HTTP requests against the list of URLs considered "active client" requests. The particular pattern match rule may be configurable, such as defined as a percentage of the request that must match, as a regular expression, or the like. As described above, a rule may be defined that ignores a query string of the requests. If a new request is determined to be an active client request, the request is not considered to have an impact on session inactivity timeout policy.

An example "second heuristic" is now described. For each new request identified as an active client request in the data store 508, the response to the request is marked as being of interest. In a first step, the response data is then passed to the pattern recognizer 502 to identify patterns in the response. Then, the data for each active client request is stored in the data store 508 with its corresponding response data. These steps generate a list of active client requests and their corresponding response data. Periodically, the list is analyzed by the pattern recognizer 502 for request and response pairs that match a defined matching rule. The matching rule is configurable, e.g., defined as a percentage of the response data that must match to be considered a significant pattern, a regular expression match, or the like. If the pattern of the request/response pair matches a configurable number of other response from the same active client request, the classifier 504 classifies the response as an expected response to the active client request. The request/response pair is then stored in the data store 508 for use by the decision module. In particular, the decision module 506 then examines responses to request that were previously marked as active client requests. If the response is classified as a response of interest, the actual response is matched against the expected response stored in the data store. The matching rule is configurable, e.g., defined by matching a percentage of the response data to the expected response data stored in the data store. If the response does not conform to the expected response, the decision module 506 may modify the response in accordance with a configured rule, such as responding with an expected response from the data store, modifying an HTTP response code, inserting an HTTP header in the response, or any combination thereof.

Thus, according to this technique, a method for detecting and applying security policy to active client requests within a secure user session begins by applying a first heuristic to a plurality of requests for a particular resource to identify a pattern indicating of an active client. In one embodiment, the heuristic evaluates a frequency of requests for the particular resource across one or more secure user sessions. Later, upon receipt of a new request for the particular resource, a determination is then made whether the new request is consistent with the pattern. If so, an action is taken with respect to a secure session policy. In one embodiment, the action bypasses the secure session policy, which policy is associated with an inactivity time-out that might otherwise have been triggered upon receipt of the new request. In addition, a second heuristic may be applied to determine whether a response proposed to be returned (in response to the new request) is expected by the active client. If so, the response is returned unaltered. If, however, applying the second heuristic indicates that the response proposed to be returned is not expected by the active client, the response is modified to create a modified (or "active client-friendly") response, which is then returned.

With the above as background, the operation of the embodiment shown in FIG. 4 is now described. At step (1), a request is made by the HTTP client, typically, an Internet browser. As shown in the drawing, the HTTP request at step (1) either is a user-initiated request (from the user interface 402) or automated request (from the active code 404) within the browser. As noted above, representative active code is the AJAX robot, although this is not a limitation, as the described technique works with any active code component, irrespective of the technique used to generate that code. At step (2), the HTTP engine 408 executing in the server web server process 406 passes the received HTTP request to the analytics engine 412 for a determination. In particular, the analytics engine has the responsibility for receiving the HTTP request, applying one or more heuristics, and determining if the request is from active client code. This determination is described in more detail below. At step (3), the analytics engine 412 outputs a response (typically, a Boolean response, or "yes/no") representing whether or not the request is from an active client. An affirmative output indicates to the HTTP engine that the request is (or may be) a request generated from active client code and, as a consequence, is (or may be) subject to a particular security policy or handling. The HTTP engine 408 then uses this determine to determine whether the inactivity time-out (or other applicable session policy) of the user session is adjusted. At step (4), the request for the web resource 410 is made. The web resource 410 may be from another secure web server in the case of a web proxy. At step (5), the resource is passed back to the HTTP engine 408. If the request was from active client code (as determined in step (2), and as indicated at step (3)), the resource (namely, the HTTP response to the HTTP request) is passed back to the analytics engine 412. At step (6), the analytics engine 412 compares the response to one or more other responses for that same resource. If the analytics engine 408 then determines that the response is a repeated response, the secure web server (as will be described) will continue processing the response in the usual manner (passing it back to the client). If, however, the analytics engine 408 determines that the response is an anomaly, the analytics engine 408 modifies the response according to a configured rule. The configured rule may vary, but as described below typically involves inserting a header, changing a response code, constructing an entirely new response, or the like. At step (7), the output from the analytics engine 408 either is a successful status, or a modified response. At step (8), the response is then sent back to the client to complete the HTTP request-response transaction.

Thus, as can be seen, preferably an HTTP request received is first processed by the analytics engine, which differentiates (based on one or more heuristics) whether the request is from a user, or is an automated request from active client code. The requested resource is then retrieved, and preferably this resource also is analyzed by the analytics engine before the response to the HTTP request is returned to the requesting client. The analytics engine then determines if the response is consistent with previous active client code requests. If the response is repeated from a previous patterned request, the requested resource (the HTTP response) is returned unmodified. If, however, the response indicates an anomaly, a different (or modified) HTTP response is returned in response to the HTTP request.

The analytics engine thus preferably performs several operations: active client determination, and response processing. Active client determination generally proceeds as follows. As described above, the heuristic(s) used to detect whether a request is from active client code (or, more generally, an automated process acting on behalf of a user) may be quite varied, and it may be based on any number of methods or criteria. One example considers the frequency with which a request is performed across a set of user sessions. If a request is issued with a regular frequency for a set of user sessions, this would indicate a pattern that could only be established using active code. As an example, assume a first user logs into the web server and accesses a resource such as index.html. If the index.html file contains active code that starts executing a static request periodically, then this pattern is recorded by the analytics engine. If then a second user performs the same access patterns and the same static code is generated in a repeated fashion, it is unlikely that any such access is being generated by the user himself. In such case, the analytics engine determines that the request is from active client code executing within a secure session. That determination can then be used to alter, augment or modify some security policy, such as a user-centric security policy concerning an inactivity time-out. In a particular solution, the security policy is modified so that the particular time-out is not re-set for this particular access pattern (URL, or portion thereof).

In addition, and as also described above, once a request has been marked as originating from an automated user agent, e.g., active client code, the analytics engine preferably also is tasked with determining if the response is an expected response or an unexpected response. If the response is determined to be an unexpected response (e.g., an error message), action can be taken, e.g., based on a user-defined rule. The heuristic(s) used to detect unexpected responses may be based on one or more criteria, such as a percentage resemblance of previous responses; i.e. if a response is determined to resemble or closely resemble (potentially based on a configurable percentage parameter, e.g., 80% alike) the response pattern, the response is flagged as an expected response. If this occurs, a different, configured (or mapping) code is used to generate the active client-friendly response.

Thus, according to the described embodiment, a secure web server that holds user sessions determines if a particular request is being accessed by an active client, or by an end user. Using analytical techniques across a set of requests, patterns are used to determine whether a particular URL is likely being accessed by active code. Preferably, such requests are then excluded from impacting secure web server inactivity timers, and the responses from such requests are (or may be) modified to conform to one or more pre-defined responses for active clients.

The subject matter described herein has many advantages. A significant advantage is that active client requests do not undesirable behaviors within browsers for inactivity time-out handling and dynamic response rendering. A system administrator need not analyze (or be involved in determining) which requests are deemed to be from active clients (as opposed to end users). The solution distinguishes between dynamic user-driven requests generated for a URL from active client requests for that same URL, based simply on access patterns for that URL within the user session. Once determined, the secure web server can handle the request more appropriately, preferably using a particular security policy. The described approach enables response generation that conforms to active client code development techniques, as well as the ability to exclude such requests from adversely impacting user-centric security policy controls, such as inactivity time-outs. Moreover, by implementing this analytical approach, it is not necessary to include additional hardware or infrastructure to provide special handling of active client requests.

The described technique addresses the known problem of unpredictable behavior of user-based inactivity and lifetime time-outs triggered (namely, re-set) during active client interaction. The technique enables the web server (or, more generally, the data processing system) to apply different timeout policy based on determining whether the request within a secure session is from an active or passive client.

The techniques described herein have application beyond inactivity timeout policy. One example is tolerance detection for denial of service (DoS)-style attacks. In this example, the system is configured to detect repeated, bursty operations to sets of URLs. An associated security policy would then deny the associated client IP address as being unauthorized to access the system. More generally, the approach may be applied to apply different policy to repeated operations associated with a URL and that is processed in the manner described, irrespective of the particular application.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The secure web server itself may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the analytics engine components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the analytics framework that provides the active client determination, and the associated response processing, which are described above.

The active client determination and response processing functionality provided by the analytics engine may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, Chrome or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

The term "active client" should be broadly construed to refer to any client-side code that generates requests, e.g., HTTP-based requests, without user involvement or interaction with the browser or other client code in which that active client executes.

Having described our invention, what we now claim is a follows:

1. A method for detecting and applying security policy to client requests within a secure user session, comprising:
    applying a first heuristic to a plurality of requests for a particular resource to identify a pattern indicative of an active client that operates without user intervention within the secure user session;
    upon receipt of a new request for the particular resource, determining whether the new request is consistent with the pattern;
    if the new request is consistent with the pattern, taking an action with respect to a secure session policy;
    applying a second heuristic to determine whether a response proposed to be returned in response to the new request is expected by the active client; and
    if the response proposed to be returned in response to the new request is expected by the active client, returning the response.

2. The method as described in claim 1 wherein the first heuristic evaluates a frequency of requests for the particular resource across one or more secure user sessions.

3. The method as described in claim 1 wherein the action bypasses the secure session policy.

4. The method as described in claim 3 wherein the secure session policy is associated with an inactivity time-out.

5. The method as described in claim 1 further including:
    if the response proposed to be returned in response to the new request is not expected by the active client, modifying the response to create a modified response; and
    returning the modified response.

6. The method as described in claim 1 wherein the secure user session is a secure web user session and the request is an HTTP request.

7. The method as described in claim 6 wherein the active client is AJAX code.

8. Apparatus, comprising:
    a processor;
    computer memory holding computer program instructions that when executed by the processor perform a method for detecting and applying security policy to client requests within a secure user session, the method comprising:
        applying a first heuristic to a plurality of requests for a particular resource to identify a pattern indicative of an active client that operates without user intervention within the secure user session;
        upon receipt of a new request for the particular resource, determining whether the new request is consistent with the pattern;
        if the new request is consistent with the pattern, taking an action with respect to a secure session policy;
        applying a second heuristic to determine whether a response proposed to be returned in response to the new request is expected by the active client; and
        if the response proposed to be returned in response to the new request is expected by the active client, returning the response.

9. The apparatus as described in claim 8 wherein the first heuristic evaluates a frequency of requests for the particular resource across one or more secure user sessions.

10. The apparatus as described in claim 8 wherein the action bypasses the secure session policy.

11. The apparatus as described in claim 10 wherein the secure session policy is associated with an inactivity time-out.

12. The apparatus as described in claim 8 wherein the method further includes:
    if the response proposed to be returned in response to the new request is not expected by the active client, modifying the response to create a modified response; and
    returning the modified response.

13. The apparatus as described in claim 8 wherein the secure user session is a secure web user session and the request is an HTTP request.

14. The apparatus as described in claim 13 wherein the active client is AJAX code.

15. A computer program product in a computer readable medium for use in a data processing system, the computer program product holding computer program instructions which, when executed by the data processing system, perform a method for detecting and applying security policy to client requests within a secure user session, the method comprising:

applying a first heuristic to a plurality of requests for a particular resource to identify a pattern indicative of an active client that operates without user intervention within the secure user session;

upon receipt of a new request for the particular resource, determining whether the new request is consistent with the pattern;

if the new request is consistent with the pattern, taking an action with respect to a secure session policy;

applying a second heuristic to determine whether a response proposed to be returned in response to the new request is expected by the active client; and if the response proposed to be returned in response to the new request is expected by the active client, returning the response.

16. The computer program product as described in claim 15 wherein the first heuristic evaluates a frequency of requests for the particular resource across one or more secure user sessions.

17. The computer program product as described in claim 15 wherein the action bypasses the secure session policy.

18. The computer program product as described in claim 17 wherein the secure session policy is associated with an inactivity time-out.

19. The computer program product as described in claim 15 wherein the method further includes:

if the response proposed to be returned in response to the new request is not expected by the active client, modifying the response to create a modified response; and returning the modified response.

20. The computer program product as described in claim 15 wherein the secure user session is a secure web user session and the request is an HTTP request.

21. The as described in claim 20 wherein the active client is AJAX code.

22. Apparatus, comprising:

a processor;

computer memory holding computer program instructions that when executed by the processor during an existing secure user web session (i) heuristically determines whether an HTTP request is received from an active client by applying a first heuristic to a plurality of requests for a particular resource to identify a pattern and determining whether the HTTP request is consistent with the pattern, and if so, (ii)(a) bypasses a security policy otherwise applicable to the HTTP request, and (b) heuristically determines whether to modify a response to the HTTP request prior to returning the response to the active client by applying a second heuristic to determine whether the response proposed to be returned in response to the new request is expected by the active client, the active client comprising code that generates automated requests.

* * * * *